Patented Aug. 16, 1949

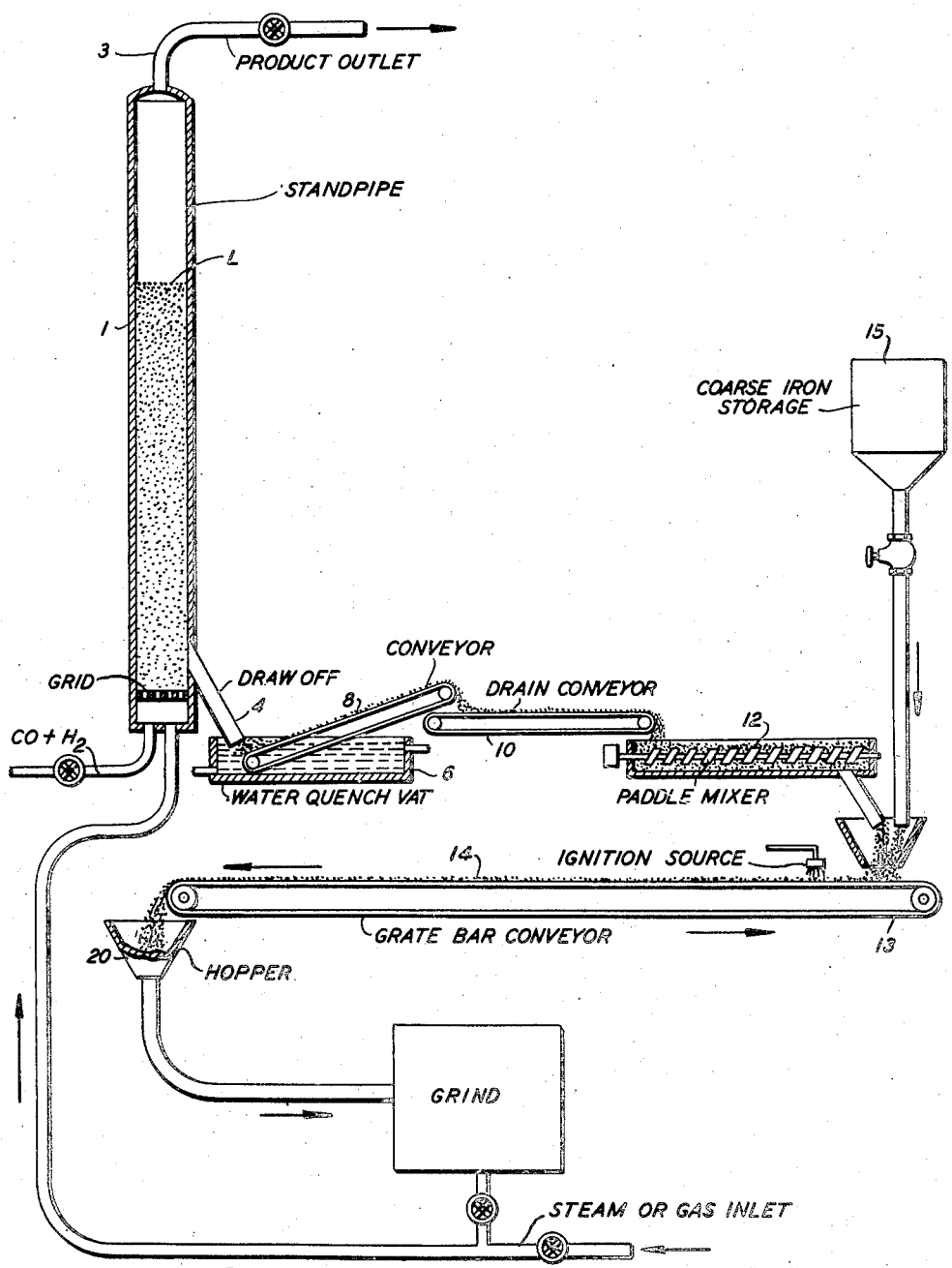

2,479,420

UNITED STATES PATENT OFFICE 2,479,420

CATALYST RECOVERY IN HYDROCARBON SYNTHESIS PROCESSES

Marnell A. Segura, Denham Springs, La., assignor to Standard Oil Development Company, a corporation of Delaware Application September 26, 1946, Serial No. 699,561

10 Claims. (Cl. 260—449.6)

My present invention relates to the synthesis of hydrocarbons from carbon monoxide and hydrogen in the presence of an iron catalyst and in particular it relates to the handling of a powdered iron catalyst employed in a fluid catalyst type of process in such a manner as to insure good fluidization of the catalyst with minimum catalyst losses due to excessive attrition, all of which will more fully appear hereinafter.

It is known, of course, that in chemical reactions involving a gas and solid, one or more stationary beds of the latter have been used, the gas being forced through the bed or beds under the proper conditions. The use of fluidized powdered catalyst is also a matter of record and commercial practice. In the latter process, the gasiform material is caused to flow upwardly through a reaction zone under controlled velocities in contact with a powdered catalyst thus forming a dense, turbulent, ebullient suspension of the powder in the gasiform material.

In many chemical processes employing the fluid catalyst technique, contaminating deposits form on the catalyst during the process. These deposits not only impair the activity of the catalyst but in the case of certain reactions such as the hydrocarbon synthesis reaction, interfere with the fluidization of the catalyst so that instead of remaining in the reaction zone as a dense turbulent suspension, it tends to disintegrate, physically, and pass out of the reactor at the top. This is highly undesirable for the following reasons. The latest fluid catalyst reactor designs are of the "bottom draw-off" type which signifies that catalyst removed for one reason or another, such as to reheat or cool, or to regenerate the same, is withdrawn from a point at the side or bottom and only a small portion is entrained in the gasiform material passing from the top of the reactor. This type of reactor is of course very much preferred to the overhead draw-off type since it greatly reduces the number of gas-solids contacting devices required outside the reactor to separate catalyst from gases and/or vapors.

But as stated, in the bottom draw-off type of reactor, unless the particle size and distribution of the catalyst is maintained within prescribed limits, a proper separation of catalyst from gasiform material will not occur within the reactor and copious quantities of catalyst will pass out of the reactor with the vapors, fumes, gases, etc., thus incurring an expensive and difficult catalyst separation problem.

One aspect of my invention relates, as indicated, to handling powdered catalyst in a delayed settler, bottom draw-off fluid catalyst reactor processing a mixture containing carbon monoxide and hydrogen to form hydrocarbons and oxygenated hydrocarbons. In the case where the catalyst is powdered iron, carbonaceous deposits form on the catalyst not only impairing its activity, but worse still causing physical disintegration thereof. That is to say, the catalyst powder contaminated with carbonaceous deposits may be procured in a readily fluidizable state by maintaining it in the following particle size and distribution:

0–20 microns less than 20%
20–40 microns less than 20%
40–80 microns less than 25%
80 plus microns less than 35%
(all material less than 100 mesh)

When, in operation, there is an increase in the amount of catalyst fines, the same is evidenced by a large temperature gradient from the top to the bottom of the fluid bed. That is to say, suppose the catalyst bed to be 25 to 30 feet in depth, then under good fluidization of the catalyst, no two points in the bed will have a temperature difference exceeding 4° to 5° F. But when this temperature difference from the top to the bottom of the bed amounts to say 50° F., poor fluidization is indicated. Another indication of poor fluidization is the drop in the heat transfer coefficient and the development of hot spots in the bed. These conditions usually become severe enough to necessitate discontinuing the operation to change catalyst when the fines having a particle size of 0 to 20 microns amount to 40 to 50 per cent of the bed. To give more details, it has been found that if the fluidized bed of iron catalyst does not have the proper particle size distribution the heat transfer coefficient will be poor, which causes poor fluidization, large losses of catalyst fines from the bed, poor heat transfer and large temperature gradients. As to heat transfer the following data show the effect of improper particle size distribution and the method of curing it:

| Roller Analysis (C-free basis) | A | B | C |
|---|---|---|---|
| 0–20 microns | 11.6 | 38.2 | 23.9 |
| 20–40 microns | 19.8 | 11.7 | 7.3 |
| 40–80 microns | 21.9 | 33.2 | 20.7 |
| 80–200 microns | 46.7 | 16.9 | 48.1 |
| Heat Transfer Coefficient, B. t. u./(Hr.) (Sq. Ft.) (°F.) | 100 | 40 | 90 |

Condition A is that at the start of a run before any catalyst disintegration. Condition B is that after serious disintegration, resulting in greatly lowered heat transfer coefficient to the cooling surface disposed within the bed. Coarse catalyst of 80–200 microns is now added to the extent of 60% by weight of the catalyst already present. This gives condition C, in which the particle size distribution, and accordingly the coefficient, are restored nearly to A.

In the example given, 60% of 80–200 micron size was added to correct the particle size distribution. Obviously an analysis must be made periodically of the particle size of the iron powder in the bed and then by calculation the proper amount of coarse resintered or fresh powder may be added so as to form a bed of the proper particle size distribution within the limits herein prescribed. As stated, the main bulk of the catalyst will have a particle size of from 40 to 200 microns.

According to my invention, I withdraw catalyst from the reactor, resinter the same and return the resintered material to the reactor, of a size in which it can be readily fluidized, all of which will more fully appear presently.

In the accompanying drawing, I have shown diagrammatically an apparatus in which a preferred modification of my invention may be carried into effect.

Referring in detail to the drawing, 1 represents a fluid catalyst hydrocarbon synthesis reactor. It will not be necessary for a proper understanding of my invention that the method of carrying out the synthesis proper be described in detail. It will suffice to say that in reactor 1 a mixture of carbon monoxide and hydrogen is fed to the reactor containing a bed of fluidized powdered iron catalyst. Conditions for a typical run will be given hereinafter, together with the yield. As stated, carbonaceous deposits form on the catalyst and in, say, 100 hours, as much as 50 pounds of carbon may be on each 100 pounds of catalyst. This will tend to destroy the activity of the catalyst and also cause its physical disintegration so that fines in copious quantities will appear in pipe 3 with the gasiform products instead of remaining in the reactor as a dense suspension between the bottom of the reactor and the level L which I have chosen to represent the upper dense phase level of the fluidized catalyst bed.

To correct this defect, I withdraw catalyst intermittently or continuously through a draw-off pipe 4, and since the catalyst is hot (575° F. to 675° F.), I first quench it in water, contained in a receiver 6, to about atmospheric temperature. The quenched catalyst is withdrawn from the vessel 6 by a conveyor 8, discharged on a drain or reticulated conveyor 10 where water is permitted to drain off, to the extent that the remaining water is about 21 weight per cent of the catalyst, thence discharged into a mixer 12 where a fuel (if necessary) may be added, such as oil, coal, coke, etc., and thence the iron or the iron-fuel mixture is fed into a grate bar conveyor. This grate bar conveyor carries a moving screen, or other foraminous member, having openings, say, ¼ inch in size. In order to increase the porosity of the bed and to further regulate the fuel content of the mixture, if such regulation is desirable, coarse iron oxide from a supply hopper 15 is added to the mixture. This coarse material may be previously used and resintered but unground catalyst, or it may be fresh, unused iron oxide. The amount of the coarse material added to the catalyst to be resintered may vary from 10 to 60% depending on the operating conditions desired in the resintering operation. A layer of this mixture, say, 6 inches thick is fed on to the moving conveyor screen. The mass is then ignited (as by a torch) and the wax and/or carbonaceous material on the iron burns, aided by air sucked through the bed by applying a vacuum at the underside of said screen. Resintering or incipient fusion of the powdered catalyst occurs, the temperature rising to about 2200° F. or higher. The resintering of the iron powder causes it to agglomerate to form particles of greater size, while at the same time, of course, the catalyst contaminants are converted to gaseous material or fumes which are emitted from the iron. A product is obtained in hopper 20 from the grate 13 which can be re-ground to the desired size and recharged to reactor 1.

A test run was made of an iron catalyst which had become contaminated with carbonaceous deposits and wax, which product was resintered and it was found that the resintered catalyst had good activity. The conditions and yield appear below:

*Run #34*

Hours _____ 92–115
Ratio of CO to $H_2$ in feed gas _____ 1.14
Temperature, °F. _____ 600
Pressure, p. s. i. g. _____ 300
V/V/Hour [1] _____ 198
cc. $C_4+$ per cubic meter $H_2+CO$ consumed __ 198
% contraction _____ 61

[1] V/V/Hr.=volumes of feed per volume of catalyst per hour.

A yield of around 200 cc. of liquid $C_4+$ product per cubic meter of feed gas ($CO+H_2$, measured at 60° F. and 1 atmosphere) is considered good.

Modifications of my invention will suggest themselves to those familiar with the art. Obviously, the resintering may be accomplished in a retort, a tube, a chamber, etc. I have shown a practical method for accomplishing the desired results continuously. Various wetting agents may be added to the quench water in the quenching zone and also the promoters may be added at this point. Also, alcohol or other liquid may be used in the quenching medium. Furthermore, make up iron or iron oxide may be added to the used catalyst fines prior to the sintering operation to replace catalyst unavoidably lost from the system. It will be obvious, of course, that the coarse iron fed onto the grate 13 must be larger in size than the openings in the screen 14 to form a layer which will prevent the fines in an upper layer from passing through the openings in screen 14. Furthermore, since, of course, iron oxide is discharged into hopper 20, it is preferable to reduce this oxide to metallic iron in the presence of hydrogen at a temperature of 700 to 900° F. before returning it to the reactor 1.

What I claim is:

1. The method of synthesizing hydrocarbons and oxygenated hydrocarbons which comprises forcing a mixture of gases containing carbon monoxide and hydrogen into a reaction zone containing a well-fluidized bed of powdered iron catalyst, maintaining hydrocarbon synthesizing conditions of temperatures and pressures in the reaction zone, permitting the reactants to remain resident in the reaction zone for a sufficient period of time to effect the desired conversion, withdrawing iron from the reaction zone, quenching the same, heating the said powdered iron to a temperature of at least incipient fusion in the presence of an oxidizing gas whereby agglomeration of the catalyst particles occurs, grinding the said particles to a size greater than the said powdered iron removed from the reaction zone and returning the ground iron to said reaction zone.

2. The method set forth in claim 1 in which the iron following quenching is dried to the extent that it contains about 21 weight per cent of moisture.

3. The method set forth in claim 1 in which additional fuel is added to the quenched powdered iron prior to subjecting it to the heat treatment.

4. The method set forth in claim 1 in which prior to subjecting the iron to the heat treatment, promoters are added thereto.

5. The method of synthesizing hydrocarbons and oxygenated hydrocarbons which comprises forcing a mixture of gases containing carbon monoxide and hydrogen into a reaction zone containing a bed of powdered fluidized iron catalyst, maintaining elevated temperatures and pressures in the reaction zone, permitting the reactants to remain resident in the reaction zone for a sufficient period of time to effect the desired conversion, withdrawing iron from the reaction zone, quenching the same to cool it to about atmospheric temperature, removing water from the powdered iron, heating the iron to a temperature of at least incipient fusion in the presence of an oxidizing gas whereby agglomeration of the catalyst particles occurs, thereafter grinding the said particles to a size greater than when fused and returning said iron to the reaction zone.

6. The method set forth in claim 5 in which the iron following quenching is dried to the extent that it contains about 21 weight per cent of moisture.

7. The method set forth in claim 5 in which additional fuel is added to the quenched powdered iron prior to subjecting it to the heat treatment.

8. The method set forth in claim 5 in which prior to subjecting the iron to the heat treatment, promoters are added thereto.

9. In the method of synthesizing hydrocarbons and oxygenated hydrocarbons in a reaction zone in the presence of a fluidized bed of powdered iron catalyst, the improvement which comprises maintaining the iron in a fluidizable state by withdrawing powdered iron, sintering the said iron in the presence of an oxidizing gas whereby carbonaceous deposits and wax are burned and removed and the particle fines are agglomerated, thereafter grinding the agglomerated material to form a powder having a size of from 40 to 200 microns and returning the same to the reaction zone.

10. The method set forth in claim 9 in which powdered iron catalyst is removed from the reaction zone at a rate responsive to the tendency of catalyst fines to pass out of the top of the reactor, sintered and reground and returned to the reaction zone so as to maintain at all times a particle size of iron catalyst in the reaction zone such that it does not contain particles smaller than 20 microns to a degree greater than 20 per cent of the total catalyst.

MARNELL A. SEGURA.

REFERENCES CITED

The following references are of record in the file of this patent:

UNITED STATES PATENTS

| Number | Name | Date |
|---|---|---|
| 2,355,016 | Stein, Jr. | Aug. 1, 1944 |
| 2,383,636 | Wurth | Aug. 28, 1945 |
| 2,393,554 | Orgozaly | Jan. 22, 1946 |